(12) United States Patent
Hofeldt

(10) Patent No.: US 6,675,447 B1
(45) Date of Patent: Jan. 13, 2004

(54) APPARATUS TO ADJUST AND MAINTAIN TAUTNESS OF A SERPENTINE ARTICLE

(76) Inventor: Albert John Hofeldt, 314 W. San Marino Dr., Miami Beach, FL (US) 33139

( * ) Notice: Subject to any disclaimer, the term of this patent is extended or adjusted under 35 U.S.C. 154(b) by 0 days.

(21) Appl. No.: 10/385,071

(22) Filed: Mar. 10, 2003

(51) Int. Cl.[7] .................................................. A44B 1/04
(52) U.S. Cl. .................. 24/129 R; 24/115 H; 24/122.6; 24/131 C; 24/130
(58) Field of Search ........................... 24/129 R, 129 A, 24/130, 131 C, 300, 115 H, 115 K, 115 M, 122.6

(56) References Cited

U.S. PATENT DOCUMENTS

| | | | | |
|---|---|---|---|---|
| 479,509 A | * | 7/1892 | Heaphy, Jr. ............... | 24/131 C |
| 757,820 A | * | 4/1904 | Lykke ........................ | 24/130 |
| 1,059,630 A | * | 4/1913 | Poetzsch ................... | 24/131 C |
| 1,782,625 A | * | 11/1930 | Neuberger ................. | 24/130 |
| 2,592,696 A | * | 4/1952 | Hoody ...................... | 24/129 R |
| 2,870,506 A | * | 1/1959 | Hudkins et al. .......... | 24/129 R |
| 3,066,372 A | * | 12/1962 | Parker ....................... | 24/130 |
| 3,888,448 A | * | 6/1975 | Rowland ................... | 24/129 R |
| 4,648,159 A | * | 3/1987 | Dougherty ................ | 24/129 R |
| 5,351,367 A | * | 10/1994 | Kennedy et al. .......... | 24/129 R |
| 6,279,205 B1 | * | 8/2001 | Steiner ...................... | 24/150 |
| 6,295,700 B1 | | 10/2001 | Plzak | |
| 6,389,655 B2 | | 5/2002 | Libecco | |

* cited by examiner

Primary Examiner—Victor Sakran

(57) ABSTRACT

An apparatus with no moving parts that enables the adjustment of the length and tautness of a serpentine article simply by sliding the apparatus. A self-locking and adjustable apparatus is described that consists of a body, an angled passage through the body for passing and gripping the serpentine article, and an anchoring channel for the attachment of one end of the serpentine article to form a loop in the serpentine article. The self-locking and adjustable apparatus can be used alone to apply circumferential force or with fasteners to apply linear force.

5 Claims, 5 Drawing Sheets

APPARATUS TO ADJUST AND MAINTAIN TAUTNESS OF A SERPENTINE ARTICLE

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of tension devices and more specifically to a self-locking and adjustable apparatus for changing and maintaining the length and tautness of a serpentine article.

Adjustable tension devices for a serpentine article has many applications including tie-down cords, belts, straps, rigging, and tourniquets. These devices have found uses in homes and in the entertainment, sporting, travel, marine, medical, and other industries.

Easy adjustability and secure gripping have been sought after features of adjustable tension devices. The amount of tautness a tension device will maintain before it slips or breaks depends not only upon the tensile strength of the serpentine article but also the design and composition of the device.

A patented adjustable tension device utilizing an elastic cord in a loop configuration is the invention of Libecco, U.S. Pat. No. 6,389,655 B2, May 2002, ADJUSTABLE ELASTIC TIE-DOWN CORD. The prior art of Libecco's invention is illustrated in FIG. 1. The ADJUSTABLE ELASTIC TIE-DOWN CORD consists of an adjusting retainer bar, two hooks, and an elongated elastic cord. Elastic cord 11 originates at stop knot 12, passes through passage 13, forms an adjustable loop to which hook 14 is attached, passes through passage 15 that has protrusions, and terminates in a non-adjustable loop that has hook 16 attached. The length and tautness of the tie-down cord is adjusted by sliding cord 11 through passage 15 in retainer bar 10. The protrusions provided in passage 15 engage and penetrate the stretch cord for assisting and locking it in position within the passage.

A patented buckle for adjusting the length and tautness of a serpentine article is the invention of Plzak, U.S. Pat. No. 6,295,700, October 2001, BUCKLE FOR MAINTAINING TENSION IN A SERPENTINE ARTICLE. The prior art of Plzak's invention is illustrated in FIG. 2. The BUCKLE FOR MAINTAINING TENSION IN A SERPENTINE ARTICLE consists of pin 20, first cam load bearing portion 21, second cam load bearing portion 22, first structure load bearing portion 23, second structure load bearing portion 24, serpentine article 25, axis of rotation 26, cam 27, handle 28, and channel 29 in handle 28. To adjust the tension on serpentine article 25, serpentine article 25 is passed through the circuitous route within the buckle. Tension on serpentine article 25 causes cam 27 to rotate clockwise around axis 26 and pinch serpentine article 25 between (1) the first cam 21 and first structure 23 load bearing portions, and between (2) second cam 22 and second structure 24 load bearing portions. Handle 28 attaches to cam 27. Channel 29 in handle 28 provides space for the passage of serpentine article 25. To release the tension on serpentine article 25, handle 28 is depressed. Cam 27 rotates on pin 20.

The deficiencies of the ADJUSTABLE ELASTIC TIE-DOWN CORD of Libecco are (1) the strength of the grip is limited to the strength of the protrusions within the passage in the retainer bar, (2) the diameter of the holes in the retainer bar must be closely matched with the diameter of the cord because the protrusions must penetrate the cord to lock it into position, (3) the protrusions restrict sliding and hinder cord adjustments, (4) the protrusions penetrate the cord and may damage and weaken the cord, and (5) when the two hooks are under tension, the line of force is through channel 15 and not through the center of the loop, this causes the retainer bar to pivot which may lead to instability of the tension device.

The deficiencies of the BUCKLE FOR MAINTAINING TENSION IN A SERPENTINE ARTICLE of Plzak are as following. (1) The rotary cam is a key feature of Plzak's invention. Because it is movable, the buckle has the problems inherent of moving parts, particularly since the parts are exposed to environmental conditions. Dust and debris can collect between the cam and the pin with potential malfunction of the moveable cam. Depending upon the composition of the pin, salt water may corrode the pin when made of metal and cause the cam to malfunction. (2) The multiplicity of weight bearing parts, cam 27, housing structures 23 and 24, and pin 20, increases the number of items that are subject to wear and damage by the stress of heavy loads as compared to a tension device constructed of a single part. The strength of the buckle depends not only upon the composition of the housing structure and cam, but also on the composition of pin 20 and how pin 20 is attached to the housing.

Unlike the invention of Libecco, which is designed for a round elastic cord, my tension device can secure a serpentine article of any shape and made of non-elastic or elastic material. One reason my invention is more versatile is that my lock mechanism is not dependent upon protrusions but due to forces applied by the angled channel. In Libecco's invention while the protrusions engage the cord under tension they also impede the movement of the cord for adjusting the overall length of the tie-down. The channel in my invention is smooth and the serpentine article easily slides through my invention for adjusting the tautness or length.

When detaching an elastic tie-down, it is safer to release the tension of the tie-down by sliding the tension device prior to unfastening the hooks. Because Libecco's invention has protrusions holding the cord in place, it would be difficult to loosen his tie-down while under tension. With my invention it is easy to lengthen or shorten the tie-down while under tension.

The strength of a tension device is an important parameter when securing a load. The strength of the tension device can be limited by the grip on the serpentine article and the strength of the material of the device. The strength of the invention of Libecco is as strong as the protrusions in the channel that engage the cord. The strength of the invention of Plzak is the strength of the weakest component: the cam, the housing, or the pin that holds the cam. Since the preferred embodiment of my invention has no protrusions that engage the serpentine article and no component or moving parts, the strength of the preferred embodiment is limited by only the strength of the material from which the tension device is constructed, be it, plastic, wood, or metal.

BRIEF SUMMARY OF THE INVENTION

The primary object of the invention is to provide a self-locking and adjustable tension device to change the tautness of a serpentine article while under tension.

Another object of the invention is to provide for a self-locking and adjustable tension device that easily secures a serpentine article shortened to any selected length and that the selected length is further adjustable.

Another object of the invention is to provide for a self-locking and adjustable tension device that will accommodate serpentine articles of different diameters and shapes.

Another object of the invention is to provide for a self-locking and adjustable tension device that has only one piece and thereby is as strong and as durable as the material from which it is constructed.

Another object of the invention is to provide for a self-locking and adjustable tension device for elastic and non-elastic serpentine articles.

Another object of the invention is to provide a self-locking and adjustable tension device that has no rotating parts so that there is no possibility of corrosion and malfunction due to moving parts.

Yet another object of the invention is to provide a self-locking and adjustable tension device that adjusts the length of a serpentine article simply by sliding the body of the tension device.

Still yet another object of the invention is to provide a self-locking and adjustable tension device in which the forces are evenly distributed across the body and the body does not tilt while under tension.

A further object of the invention is to provide an adjustable tension device that will adapt to multiple situations that has previously been fulfilled by several individual adjustable and non-adjustable serpentine articles. My invention obviates acquiring a variety of tension devices to prepare for unforeseen needs.

A Still further object of the present invention is to provide a self-locking and adjustable tension device with a loop that surrounds an object and exert circumferential force that can be applied and adjusted with one hand.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a tension device that adjusts the length and tautness of a serpentine article comprising: a body, an angled passage through the body for passing and gripping the serpentine article, and a method of attaching one end of the serpentine article to the body to form a loop.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

REFERENCE NUMERALS IN DRAWINGS

Figure 1:
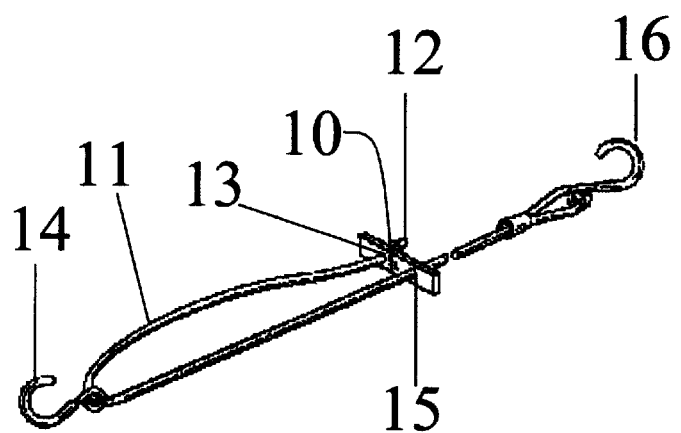
FIG. 1 is a perspective view of the prior art of the invention of Libecco.

10 retainer bar
11 elongated elastic cord
12 stop knot
13 passage
14 hook
15 passage with protrusions
16 hook
20 pin
21 first cam load bearing portion
22 second cam load bearing portion
23 first structure load bearing portion
24 second structure load bearing portion
25 serpentine article
26 axis of rotation
27 cam
28 handle
29 channel in arm handle
30 body
31a first segment of channel
31b second segment of channel
31c third segment of channel
32 anchoring channel
34 recess
35 bore hole
36 first aspect
37 second aspect
38 first bend
39 second bend
41 hook
42 hook
43 knot
44 segment of serpentine article
45 loop
46 serpentine article
50 serpentine article
51 loop
52 knot
80 bend
81 bend
82 sphere 83 serpentine article
90 bend
91 bend
92 bend
93 serpentine article
100 bend
101 bend
103 serpentine article
110 slot
111 slot
112 partition
113 partition
114 partition
115 channel
116 channel
117 channel
118 channel
119 serpentine article
120 body
121 channel
122 channel
123 channel
124 channel
125 back
126 partition
127 partition
128 partition
129 screw
130 body
131 serpentine article

DETAILED DESCRIPTION OF DRAWINGS

Figure 2:
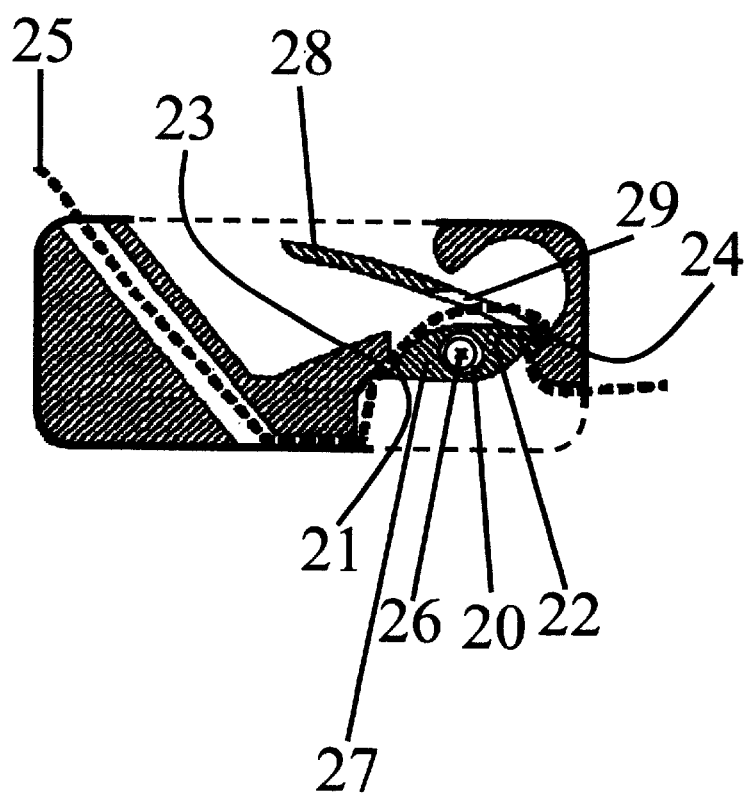
FIG. 2 is a cross-sectional view of the prior art of the invention of Plzak.

Description—FIGS. 1 and 2—Prior Art

In FIG. 1 is illustrated the prior art of the ADJUSTABLE ELASTIC TIE-DOWN CORD of Libecco. The invention consists of retainer bar 10, elongated elastic cord 11, end with stop knot 12, passage 13 without protrusions, hook 14 attached to adjustable loop, passage 15 with protrusions for gripping the cord, and hook 16 attached to non-adjustable loop.

In FIG. 2 is illustrated the prior art of the BUCKLE FOR MAINTAINING TENSION IN A SERPENTINE ARTICLE by Pizak. The invention consists of pin 20, first cam load bearing portion 21, second cam load bearing portion 22, first structure load bearing portion 23, second structure load bearing portion 24, serpentine article 25, axis of rotation 26, cam 27, handle 28, and channel 29 in handle 28.

DETAILED DESCRIPTION OF THE PREFERRED EMBODIMENTS

The term serpentine article is used herein to denote an object that is flexible and elongated, having unspecified length, and a cross-sectional ratio of unity or less; where the cross-sectional ratio is the smallest cross-sectional diameter divided by the largest cross-sectional diameter. Some examples of serpentine articles include: lines, cords, straps, cables, ropes, belts, and strings. This list is illustrative only and many more examples of serpentine articles with which my tension device is useful will be obvious to one skilled in the art.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Description—FIGS. 3–7—Preferred Embodiment

Figure 3:
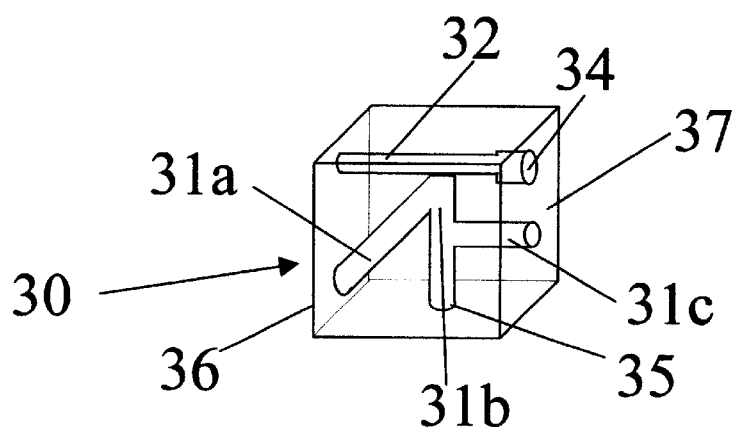
FIG. 3 is an isometric view of my self-locking and adjustable tension device.

In accordance with the present invention, FIG. 3 shows my tension device consisting of body 30, slide and lock channel 31a–c, bore hole 35, anchoring channel 32, and recess 34 of channel 32. Channels 31a–c and 32 extend across body 30 from first aspect 36 to second aspect 37 of body 30. Channel segment 31a pierces body 30 near the bottom edge of first aspect 36. Channel segment 31c pierces body 30 near the center of second aspect 37. Channel 32 pierces body 30 near the top edge of first aspect 36 and the top edge of second aspect 37. The diameter of recess 34 is large enough to accept a terminus that is larger than the diameter in the other part of channel 32. Bore hole 35 permits access for constructing channel 31b. The channels in the preferred embodiment are round, however, the channels can be other shapes: a few examples are oval, octagonal, and rectangular. In the preferred embodiment, body 30 is composed of acetal resin, however, it can be constructed of other materials, such as, other plastics, wood, or metal.

Figure 4:
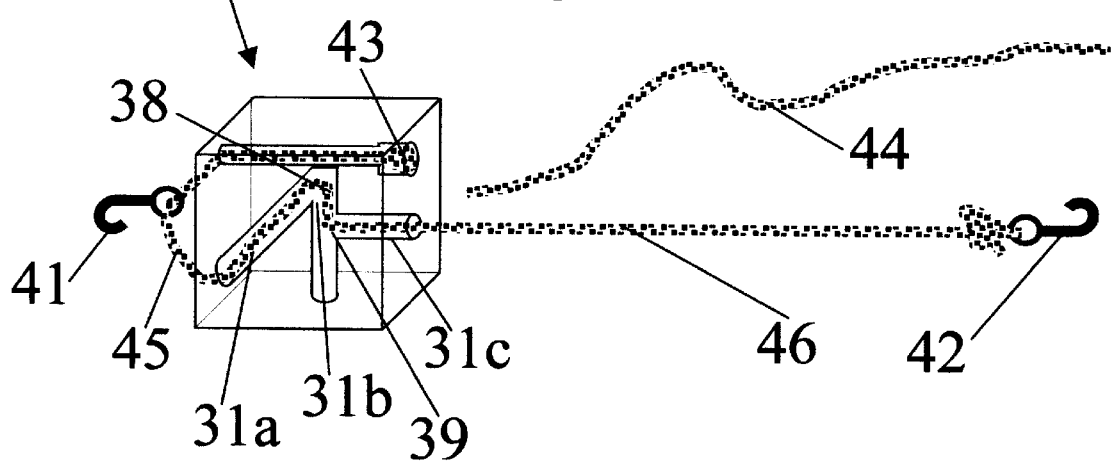
FIG. 4 is an isometric view of my self-locking and adjustable tension device with hooks and a serpentine article arranged to exert linear force.

In accordance with an important feature of the present invention, there is shown in FIG. 4 where slide and lock channel 31a–c has two bends, first bend 38 and second bend 39. Segment 31b between bends 38 and 39 is of substantial length so that serpentine article 46 completes bend 38 and passes straight prior to reaching bend 39. The angle of the second bend 39 depends upon the angle of first bend 38. In the preferred embodiment, first bend 38 is 45 degrees and second bend 39 is 90 degrees. However, first bend 38 can be any angle that in conjunction with second bend 39 orients segment 31c to exit near the center of second aspect 37.

The force on knot 43 is directed through the opening of channel 32 at the upper edge of first aspect 36 to loop 45. In the preferred embodiment, the relative positions of channels 31a and 32 are such that serpentine article 46 between second aspect 37 and hook 42 aligns with the center of loop 45.

Figure 5:
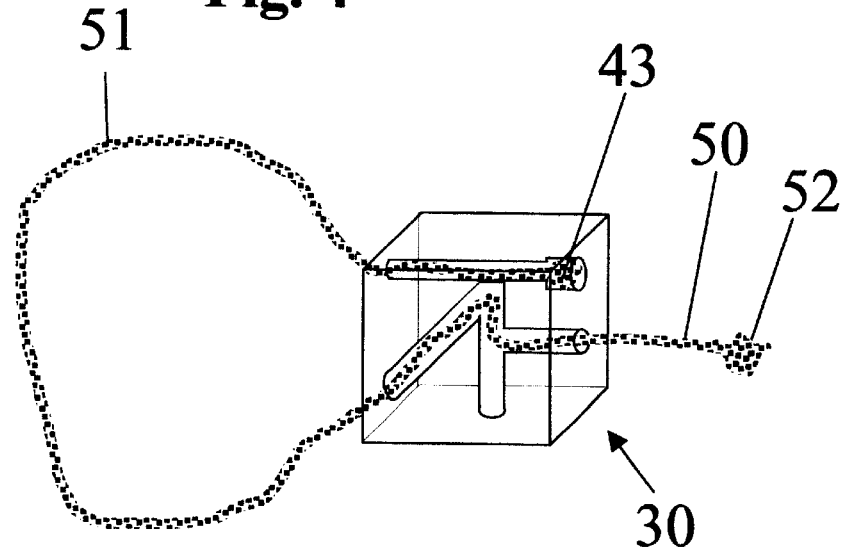
FIG. 5 is an isometric view of my self-locking and adjustable tension device with a serpentine article arranged to exert circumferential force.
Figure 6:
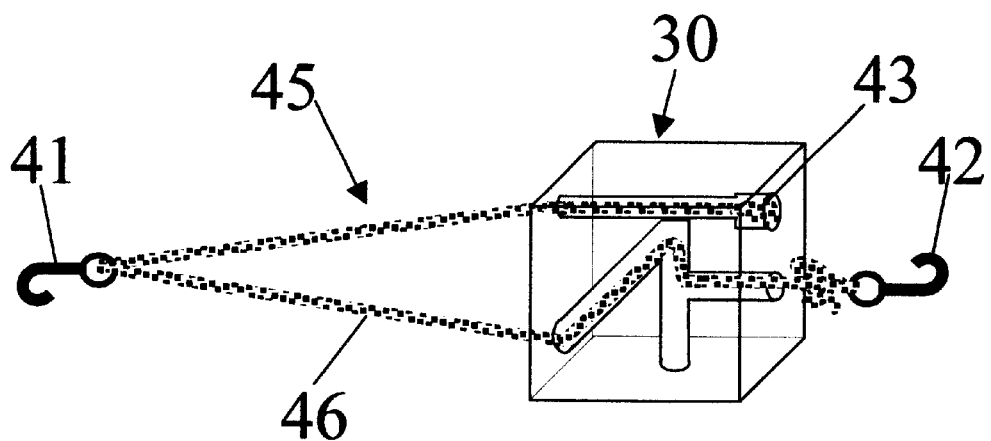
FIG. 6 is an isometric view of my self-locking and adjustable tension device adjusted to shorten the serpentine article as compared to FIG. 4.
Figure 7:
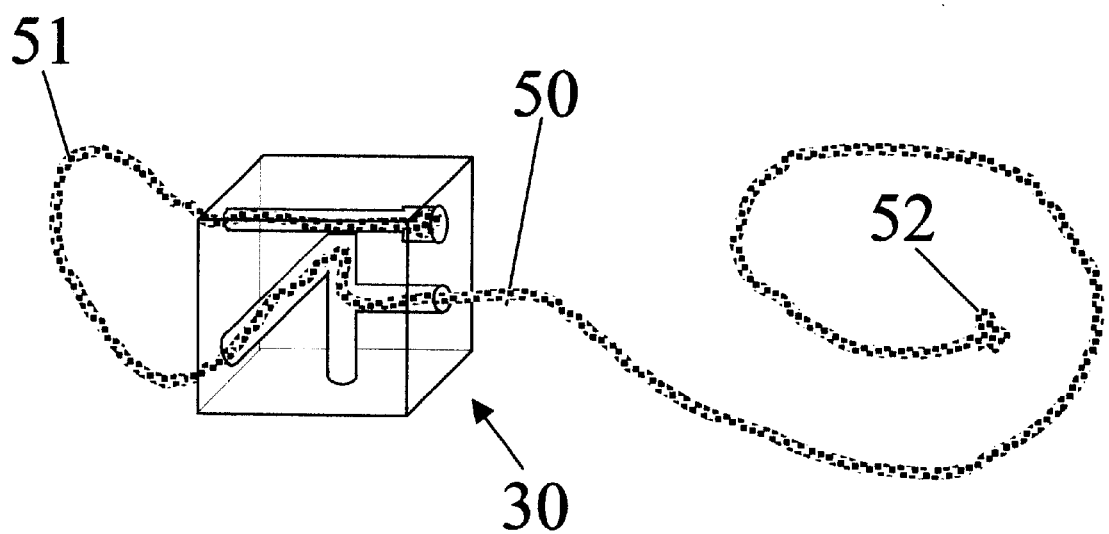
FIG. 7 is an isometric view of my self-locking and adjustable tension device adjusted to reduce the circumferential distance of the loop as compared to FIG. 5.

FIG. 4 shows the setup for my tension device to adjust the linear length By comparing FIGS. 5 and 7, you will see that the diameter of loop 51 decreases as body 30 slides away from knot 52. By comparing FIGS. 5 and 7, you will see that the diameter of loop 51 decreases as body 30 slides away from knot 52, cut off segment 44 from serpentine article 46 determines the maximum length between hooks 41 and 42. After segment 44 is cut off, knot 43 is tied in serpentine article 46 and concealed in recess 34. In the preferred embodiment, serpentine article 46 is anchored by knot 43; however, the terminus can be a mechanical device, such as, sphere 82 as seen in FIG. 8.

In the preferred embodiment serpentine article 46 is round and constructed of a stretchable material, however, it can be other shapes and constructed of a non-stretchable material. It is a feature of the invention that hooks attach to serpentine article 46; however, snaps, clips, or other fasteners can be substituted for the hooks.

Turn now to FIG. 5 to see the illustration of my tension device setup to adjust circumferential length and tautness of serpentine article 50, a configuration of a belt, tourniquet, or other constricting devices. Serpentine article 50 is without hooks. Knot 52 prevents serpentine article 50 from sliding through body 30. In the preferred embodiment, knot 43 anchors serpentine article 50 to body 30, however, anchoring can be by a permanent fastener, such as, a staple, or a fastener that can be released, such as, a snap or another quick release device. In the preferred embodiment serpentine article 50 is round and constructed of a stretchable material, however, it can be of other shapes and constructed of a non-stretchable material.

Figure 8:
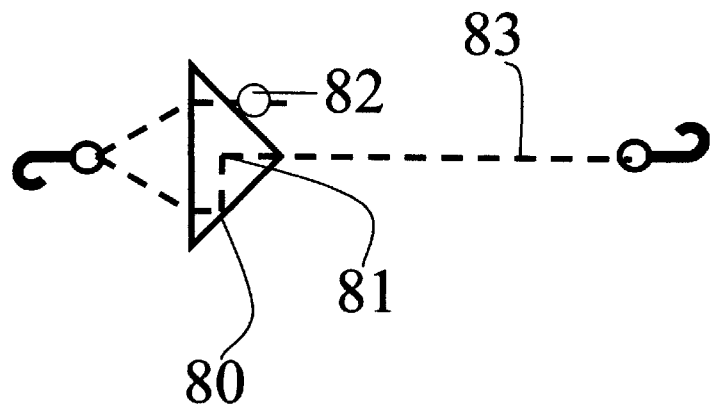
FIG. 8 is a schematic view of an alternative embodiment of my self-locking and adjustable tension device showing a triangular body and alterative shapes of the channels.
Figure 9:
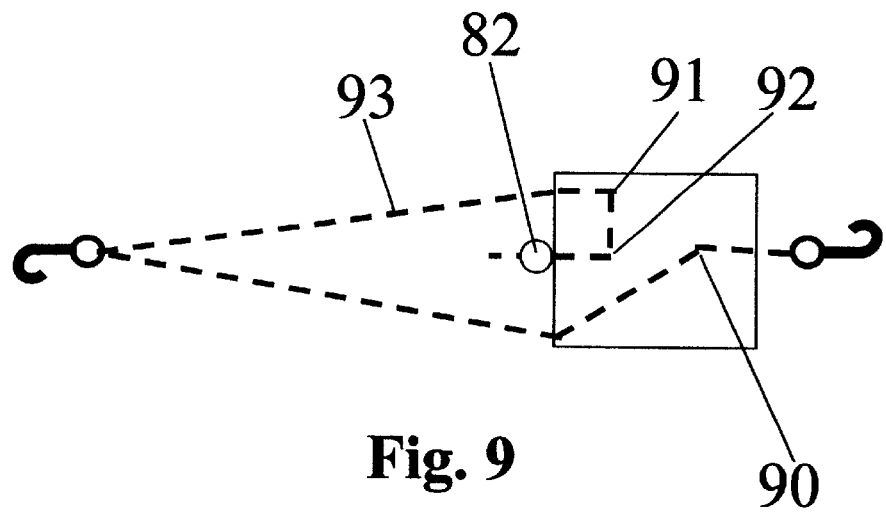
FIG. 9 is a schematic view of an alternative embodiment of my self-locking and adjustable tension device showing a rectangular body and alterative shapes of the channels.
Figure 10:
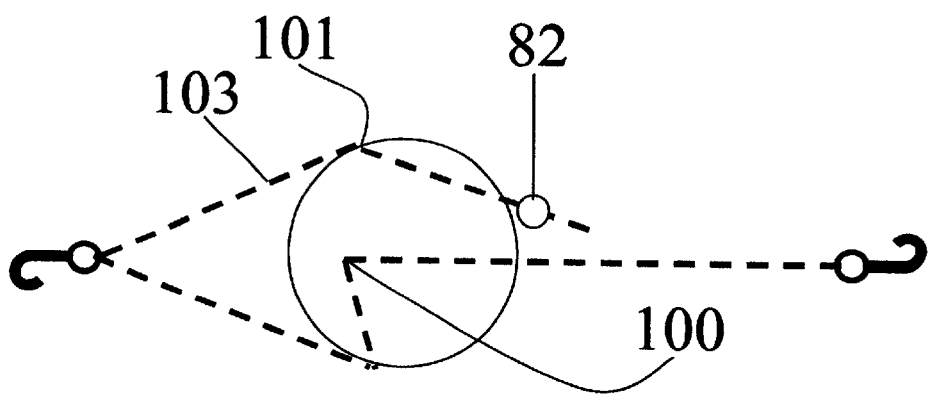
FIG. 10 is a schematic view of an alternative embodiment of my self-locking and adjustable tension device showing a round body and alterative shapes of the channels.

FIGS. 8–10, Alternative Embodiments

There are alternative configurations of the channels within my tension device. In the preferred embodiment the angle between channel segments 31a and 31b is 45 degrees and between channel segments 31b and 31c is 90 degrees. An example of an alternative configuration of the slide and lock channel is seen in FIG. 8 by bends 80 and 81, which are each 90 degrees. It is also possible that the slide and lock channel can have only one bend. When there is a single angle in the slide and lock channel, the angle of the bend can ranges from (1) an obtuse angle, such as, bend 90 as shown in FIG. 9 to (2) an acute angle, such as, bend 100 shown in FIG. 10.

As seen in the preferred embodiment, anchoring serpentine article 46 to body 30 can be by knot 43 in straight anchoring channel 32, however, the channel may not be straight, as exemplified by bends 91 and 92 in FIG. 9 and bend 101 in FIG. 10. Sphere 82 is the anchoring terminus of serpentine articles 83, 93, 103.

The shape of the body of my tension device can be other than rectangular body 30, the preferred embodiment. The triangular shaped body seen in FIG. 8 and the circular shaped body shown in FIG. 10 are examples of some alternative shapes for my invention, however, it should be understood that the shape of the body of my invention is not limited to these examples.

Figure 11:
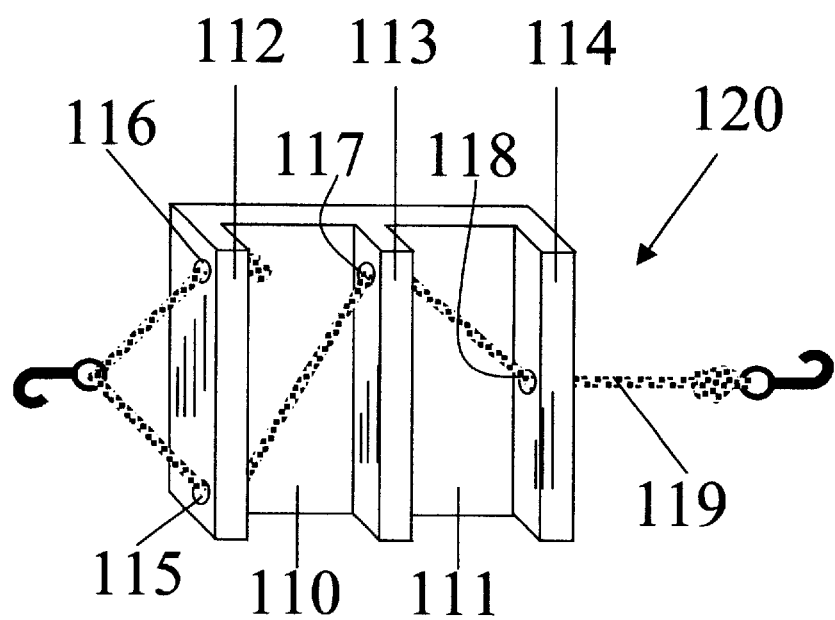
FIG. 11 is a perspective view of an additional embodiment of my self-locking and adjustable tension device showing perforated partitions.
Figure 12:
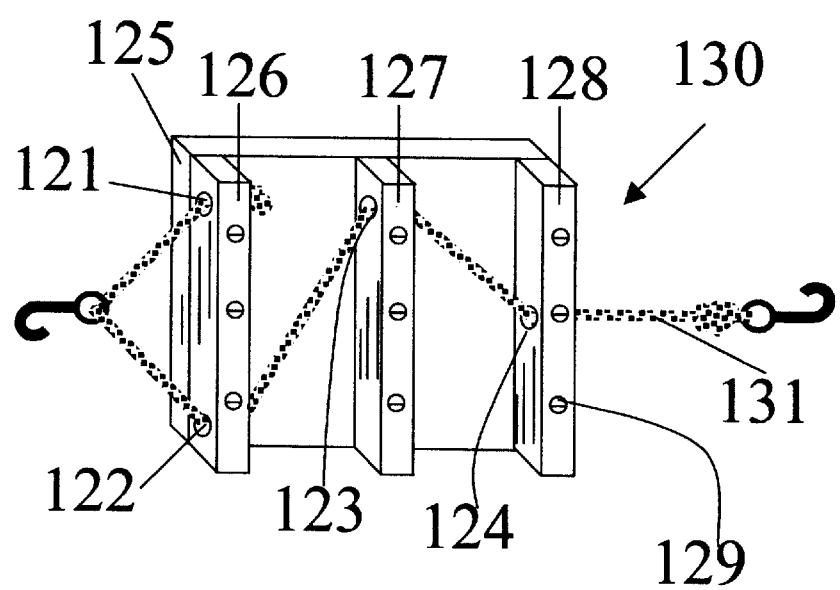
FIG. 12 is a perspective view of an additional embodiment of my self-locking and adjustable tension device constructed of parts.

FIGS. 11 and 12, Additional Embodiments

Configured differently than the continuous channel of the preferred embodiment, but sharing the unifying principles of angled pathway and force alignment to the center of the serpentine article loop are the embodiments illustrated in FIGS. 11 and 12. Directing your attention to FIG. 11, you will be see one-piece body 120 with slots 110 and 111, partitions 112, 113, and 114 with channels 115, 116, 117, and 118, and serpentine article 119. The width of the slots and the thickness of the partitions are discretionary and based upon the cross-sectional diameter of serpentine article 119, weight of the anticipated load on serpentine article 119, and the desired physical size of body 120. A face to cover the slots and partitions could increase the strength of body 120, but is not essential for the operation of my invention; however, the construction of such a cover would obvious to the skilled artesian.

Turning to FIG. 12, you will see body 130 is constructed of parts. Back 125 is joined to partitions 126,127, and 128 by screws similar to screw 129. Alternatively a bonding agent can substitute for the screws. Channels 121,122, 123, and 124 align and grip serpentine article 131. Body 130 serves only as one example of my invention constructed of parts and it should be understood there are many other possible configurations that would be evident to those skilled in the art.

Operation of the Preferred Embodiment

The preferred embodiment, when setup to adjust the linear length and tautness of a serpentine article, is configured with sliding hook 41 attached to loop 45 and a stationary hook 42 attached to the free end serpentine article 46 as seen in FIG. 4. When using my invention as a tie-down, the following steps are taken. Firstly, set the overall length of the serpentine article for the specific application by pulling the serpentine article through anchoring channel 32 until hooks 41 and 42 are separated the desired distance. Secondly, tie knot 43 and cut off segment 44 of the serpentine article. Thirdly, fasten hooks 41 and 42 to objects in preparation for traction; for example, attach one hook to a brace of a boat trailer and the other hook through an eyelet in the tarp that covers the boat. Lastly, move body 30 in the direction of hook 42 until the objects are under the desired amount of tension, for the example above, until the tarp is taut. My tension device self-locks and additional stress on the serpentine article will not result is slippage of the serpentine article. While under tension, my invention can be adjusted to increase or decrease tautness. Upon comparing FIGS. 4 and 6, it will be seen that by sliding body 30 toward hook 42, the distance between hooks 41 and 42 is shortened. To reduce tension on the serpentine article, simply slide body 30 in the direction of hook 41.

The preferred embodiment, when arranged to adjust the circumferential length and force is setup with a loop and no hooks or fasteners as illustrated in FIG. 5. For example, in the case of a tourniquet, once the overall size of loop 51 is adjusted by tying anchoring knot 43, loop 51 is placed around an extremity of a subject and serpentine article 50 is tightened until the desired tautness is achieved. By comparing FIGS. 5 and 7, you will see that the diameter of loop 51 decreases as body 30 slides away from knot 52. Serpentine article 50 can be tightened in two ways; (1) body 30 can be held in one hand while counter force is applied to serpentine article 50 or (2) serpentine article 50 can be pulled tangentially with one hand and body 30 will advance and tighten the tourniquet around the extremity. The one handed technique of tightening a tourniquet is an ideal method to secure a bleeding limb when an individual is alone. To loosen the tourniquet, one simply pulls body 30 away from the extremity.

Advantages

From the description above a number of advantages of my invention become apparent.

a. The one-piece construction makes my tension device simple to manufacture and simple to operate.

b. The absence of the rotary parts in my invention eliminates the problems inherent of moving parts.

c. My tension device is easier to adjust than other tension devices, simply slide the tension device, no release arm to press or no protrusions to move against.

d. Unlike the invention of Libecco, my tension device can be easily adjusted to shorten or lengthen the serpentine article while under tension. This makes my invention safer to use because the tension on the serpentine article can be easily released prior to unhooking the elastic tie-down.

e. Unlike the invention of Libecco, my tension device can accommodate elastic or non-elastic serpentine articles of different diameters and shapes.

f. My tension device does not pivot while under tension because forces are evenly distributed across the body of my tension device and not weighted to one side as are the forces affecting Libecco's retainer bar.

g. Unlike the invention of Plzak, the strength of my tension device is related to only the composition of the material of the body, and not to multiple components.

h. When used as a tourniquet, only one hand is needed to operate the tension device.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An adjustable tension apparatus comprising:
   (a) a body with one channel of round diameter forming one angle within said body with said channel positioned so that a serpentine article anchored on said body forms an adjustable loop when passing through said channel and the serpentine article aligns with the center of said loop when exiting said body, (b) a pair of fasteners with one of said fasteners slidably received on the serpentine article in said loop and the other of said fasteners affixed to the free end of the serpentine article, whereby said apparatus exerts linear force when the serpentine article is under tension and held taut by said body.

2. An adjustable tension apparatus comprising a body with one channel forming one angle within said body with said channel positioned so that a serpentine article anchored on said body forms an adjustable loop when passing through said channel and the serpentine article aligns with the center of said loop when exiting said body, whereby said loop surrounds an object and exerts circumferential force when the serpentine article is under tension and held taut by said body.

3. An adjustable tension apparatus comprising:

(a) a body composed of a back plate and three parallel partitions attached to said back plate with the three partitions arranged such that a serpentine article anchoring to one end of the first partition forms an adjustable loop when passing through a hole near the opposite end of said first partition, and said serpentine article forms an angle by passing through holes in the second and third partitions with the holes positioned such that the serpentine article aligns with the center of said loop when exiting said third partition, (b) a pair of fasteners with one of said fasteners slidably received on the serpentine article in said loop and the other of said fasteners affixed to the free end of the serpentine article, whereby said apparatus exerts linear force when the serpentine article is under tension and held taut by said body.

4. An apparatus according to claim 1 wherein the channel forms two internal angles in the course of traversing the body.

5. An apparatus according to claim 2 wherein the channel forms two internal angles in the course of traversing the body.

* * * * *